May 1, 1951 C. H. BEGGS 2,551,412
DEVICE FOR APPLYING NONSKID CHAINS TO TIRES
Filed Sept. 12, 1947

Inventor
CHARLES H. BEGGS
By Mason, Fenwick & Lawrence
Attorneys

Patented May 1, 1951

2,551,412

UNITED STATES PATENT OFFICE 2,551,412

DEVICE FOR APPLYING NONSKID CHAINS TO TIRES

Charles H. Beggs, Clarks Summit, Pa.

Application September 12, 1947, Serial No. 773,681

1 Claim. (Cl. 81—15.8)

This invention relates to a device for applying chains to tires.

An object of the invention is to provide a device of the character indicated of an improved and substantial construction capable of long and efficient life.

A further object of the invention is to provide a device of the character indicated, so constructed as to indicate to a person in the driver's seat of a car when the chain has been substantially applied to the tire by driving the car slightly forward.

Further objects will more particularly appear in the course of the following detailed description. The invention consists in the novel construction, arrangement and combinations of parts hereinafter more particularly described and claimed.

One sheet of drawings accompanies this specification as part thereof in which like reference characters indicate like parts throughout.

Figures 1, 2:
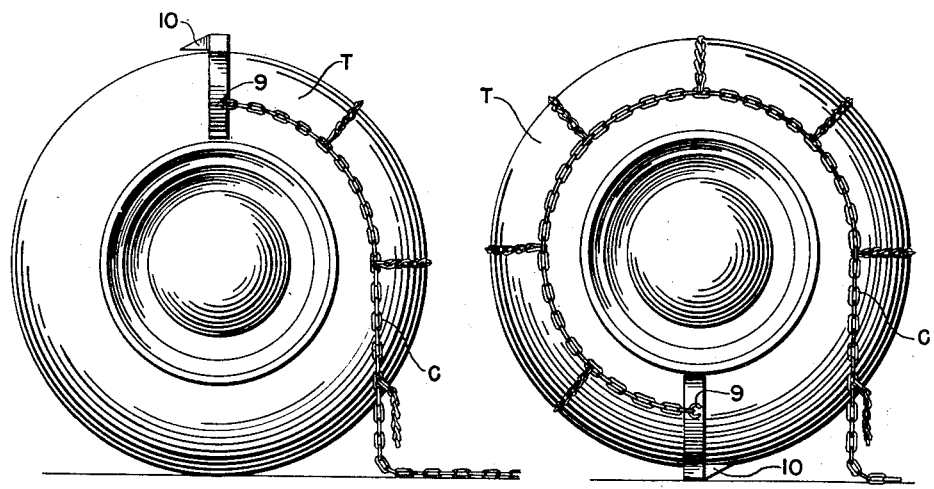
Fig. 1 shows a side elevation of an automobile wheel with the device attached to same and at the initial stage of application of the chain to the tire.
Fig. 2 is a view similar to Fig. 1 showing the chain substantially applied and ready to have its ends connected.

Referring to the drawings, two substantially arcuate members 1 and 2 are each provided with an enlarged hinge end 3 which hinge ends 3—3, are arranged to be associated by a transverse pivot pin 5 so that the concave faces of the arcuate members 1 and 2 are confronting each other while their convex faces are oppositely disposed.

Figure 3:
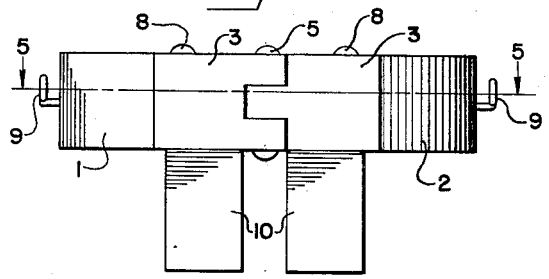
Fig. 3 is a top plan view of the improved device.
Figure 4:
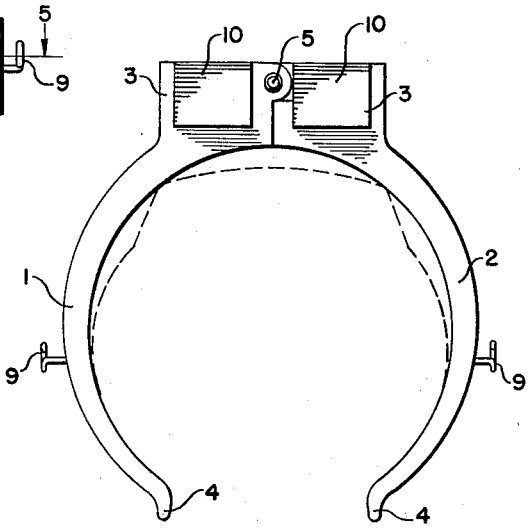
Fig. 4 is a side view of the improved device.

Each of the enlarged hinge ends 3—3 of the arcuate members is further formed with a laterally directed beveled flange 10, the beveled flanges 10 both projecting from the corresponding faces of the assembled arcuate members as shown in Fig. 3.

Figure 5:
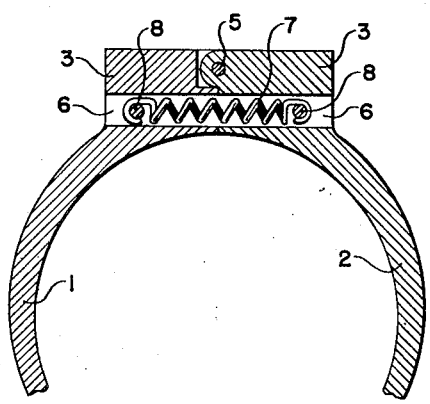
Fig. 5 is a cross section taken on line 5—5 of Fig. 3.

Each of the enlarged hinge ends 3—3 are further formed with through aligned orifices 6—6 the axis of which orifices is perpendicular to the axis of the pivot pin 5 and which orifices are offset inwardly with respect to said pivot pin 5 as shown in Fig. 5.

Within the aligned orifices 6—6 is positioned a spiral spring 7 the ends of which are securely anchored with respect to the arms 1 and 2 by the transverse pins 8—8.

On the outer convex faces of the arms 1 and 2 are positioned chain securing hooks 9—9 substantially medial of the said arcuate members, and the arcuate members are preferably formed of tapered cross sections having their free ends terminated in slightly outturned horns 4—4 to facilitate the application of the device.

In use, the arms 1 and 2 are spread apart against the tension of the springs 7 to embrace the side walls of the tire T and the ends of the chain C are secured to the hooks 9—9 as illustrated in Fig. 1, the device being applied to the tire with the beveled lugs 10 projecting forwardly as indicated in Fig. 1. With the chains and the device thus applied, the operator of the car will advance the car until the wheel rises on the lugs 10 as illustrated in Fig. 2, which, by reason of the substantial form of the hinge ends 3, is sufficient to indicate to the driver that the device has reached the ground level and to stop the car. Thereafter the opposite ends of the chain are connected to the ends thus far carried by the device and the device removed, leaving the chains in position.

By reason of the substantial construction of the parts as described, it will be apparent that the device will withstand continued usage and the spring 7 being protected by its positioning within the aligned orifice 6—6 is assured of a maximum life and can, if necessary, be replaced without difficulty.

Various modifications in the precise form and construction of the part will readily suggest themselves to those skilled in the art, but within the scope of the present invention as claimed.

What is claimed is:

Device for applying chains to tires comprising two complementary arcuate tire engaging members each having an enlarged ground engaging hinge end by which said parts are hingedly associated, each of the enlarged hinge ends having a through orifice perpendicular to and inwardly of the axis of the hinge, a spiral spring extending within said orifices and having its ends anchored to said members to urge them resiliently toward each other and chain attachment members on said arcuate members.

CHAS. H. BEGGS.

REFERENCES CITED

The following references are of record in the file of this patent:

UNITED STATES PATENTS

| Number | Name | Date |
|---|---|---|
| 1,173,683 | Richardson | Feb. 29, 1916 |
| 1,499,036 | Smith | June 24, 1924 |
| 1,500,409 | Melton et al. | July 8, 1924 |
| 1,618,161 | Allemang | Feb. 22, 1927 |
| 2,076,894 | Johnson | Apr. 13, 1937 |
| 2,330,839 | O'Brien | Oct. 5, 1943 |